US008501828B2

(12) United States Patent
Hennington et al.

(10) Patent No.: US 8,501,828 B2
(45) Date of Patent: Aug. 6, 2013

(54) CURE REBOND BINDER

(75) Inventors: Roger Hennington, Houston, TX (US); Donald H. Ridgway, Spring, TX (US); Robert A. Grigsby, Jr., Spring, TX (US); Robert G. Sawitski, Jr., Romulus, MI (US); Jennifer K. Pratt, Round Rock, TX (US)

(73) Assignee: Huntsman Petrochemical LLC, The Woodlands, TX (US)

( * ) Notice: Subject to any disclaimer, the term of this patent is extended or adjusted under 35 U.S.C. 154(b) by 1092 days.

(21) Appl. No.: 11/201,886

(22) Filed: Aug. 11, 2005

(65) Prior Publication Data
US 2006/0035990 A1    Feb. 16, 2006

Related U.S. Application Data

(60) Provisional application No. 60/600,598, filed on Aug. 11, 2004, provisional application No. 60/607,736, filed on Sep. 7, 2004.

(51) Int. Cl.
*C08G 18/18*    (2006.01)
(52) U.S. Cl.
USPC ............. 521/129; 521/54; 521/130; 521/137; 521/159; 521/170; 521/174
(58) Field of Classification Search
USPC .................. 521/54, 129, 130, 137, 159, 170, 521/174
See application file for complete search history.

(56) References Cited

U.S. PATENT DOCUMENTS

| | | |
|---|---|---|
| 2,683,730 A | 7/1954 | Seegar et al. |
| 2,787,601 A | 4/1957 | Detrick et al. |
| 2,833,730 A | 5/1958 | Barthel, Jr. |
| 2,950,263 A | 8/1960 | Abbotson et al. |
| 3,012,008 A | 12/1961 | Lister et al. |
| 3,344,162 A | 9/1967 | Rowton et al. |
| 3,362,979 A | 1/1968 | Bentley et al. |
| 3,394,164 A | 7/1968 | McClellan et al. |
| 3,747,037 A | 7/1973 | Earing |
| 3,969,262 A | 7/1976 | Wagner et al. |
| 4,060,439 A | 11/1977 | Rosemund et al. |
| 4,170,697 A | 10/1979 | Blount |
| 4,185,146 A | 1/1980 | Burke |
| 4,243,617 A | 1/1981 | Burge |
| 4,243,625 A | 1/1981 | Burge |
| 4,273,908 A | 6/1981 | Blount |
| 4,275,172 A | 6/1981 | Barth et al. |
| 4,283,311 A | 8/1981 | Blount |
| 4,296,211 A | 10/1981 | Blount |
| 4,301,254 A | 11/1981 | Blount |
| 4,314,916 A | 2/1982 | Blount |
| 4,316,967 A | 2/1982 | Hergenrother et al. |
| 4,336,340 A | 6/1982 | Blount |
| 4,347,345 A | 8/1982 | Blount |
| 4,376,171 A | 3/1983 | Blount |
| 4,385,131 A | 5/1983 | Fracalossi et al. |
| RE31,340 E | 8/1983 | Blount |
| 4,452,551 A | 6/1984 | Arndt et al. |
| 4,666,646 A | 5/1987 | Chang |
| 4,705,814 A | 11/1987 | Grigsby, Jr. |
| 4,705,840 A | 11/1987 | Buckanin |
| 4,748,192 A | 5/1988 | Smith et al. |
| 4,859,735 A | 8/1989 | Vu |
| 4,871,590 A | 10/1989 | Merz et al. |
| 4,877,829 A | 10/1989 | Vu et al. |
| 4,957,944 A | 9/1990 | Schiffauer et al. |
| 4,977,207 A | 12/1990 | Hoefer et al. |
| 5,079,276 A | 1/1992 | Kumasaka et al. |
| 5,102,953 A | 4/1992 | Yano et al. |
| 5,182,163 A | 1/1993 | Wheat et al. |
| 5,204,040 A | 4/1993 | Chang |
| 5,238,894 A | 8/1993 | Savoca et al. |
| 5,248,646 A | 9/1993 | Savoca et al. |
| 5,278,223 A | 1/1994 | Gruenewaelder et al. |
| 5,290,818 A | 3/1994 | Nafziger et al. |
| 5,306,798 A | 4/1994 | Horn et al. |
| 5,374,666 A | 12/1994 | Tamano et al. |
| 5,387,642 A | 2/1995 | Blum et al. |
| 5,447,963 A | 9/1995 | Pcolinsky et al. |
| 5,482,980 A | 1/1996 | Pcolinsky |
| 5,489,618 A | 2/1996 | Gerkin |
| 5,525,278 A | 6/1996 | Krosch et al. |
| 5,527,834 A | 6/1996 | Fujita et al. |
| 5,527,876 A | 6/1996 | Kluth et al. |
| 5,559,161 A | 9/1996 | Klotz et al. |
| 5,610,207 A | 3/1997 | De Simone et al. |
| 5,616,625 A | 4/1997 | Hung et al. |
| 5,688,835 A | 11/1997 | Scherbel et al. |
| 5,700,846 A | 12/1997 | Grigsby, Jr. et al. |
| 5,723,534 A | 3/1998 | Murray |
| 5,807,958 A * | 9/1998 | Diblitz et al. .................... 528/57 |
| 5,817,703 A | 10/1998 | Blair et al. |
| 5,869,655 A | 2/1999 | Puckett et al. |
| 6,020,429 A | 2/2000 | Yang et al. |
| 6,037,496 A | 3/2000 | Carr et al. |
| 6,054,499 A | 4/2000 | Pauls et al. |
| 6,071,977 A | 6/2000 | Austin et al. |
| 6,136,870 A * | 10/2000 | Triolo et al. .................... 521/54 |
| 6,180,686 B1 | 1/2001 | Kurth |
| 6,207,725 B1 | 3/2001 | Sieker et al. |

(Continued)

FOREIGN PATENT DOCUMENTS

| | | |
|---|---|---|
| JP | 61250039 A | 11/1986 |
| JP | 61272249 A | 12/1986 |
| JP | 8253754 | 10/1996 |

*Primary Examiner* — John Cooney
(74) *Attorney, Agent, or Firm* — Monique M. Raub

(57) ABSTRACT

The present invention provides processes for producing rebonded polyurethane foam constructs that are useful in applications such as carpet underlayments. According to the invention, a tertiary amine is employed as a catalyst either alone, or preferably in combination with other catalysts in a binder which comprises an organic isocyanate and a polyol. Inclusion of a tertiary amine as a catalyst dramatically increases production throughput.

17 Claims, No Drawings

(56) References Cited

U.S. PATENT DOCUMENTS

| | | |
|---|---|---|
| 6,231,985 B1 | 5/2001 | Chen et al. |
| 6,265,456 B1 | 7/2001 | Austin et al. |
| 6,294,589 B1 | 9/2001 | Moody |
| 6,303,731 B1 | 10/2001 | Carlson et al. |
| 6,346,205 B2 | 2/2002 | Sieker et al. |
| 6,348,121 B1 | 2/2002 | Schoener et al. |
| 6,359,023 B1 | 3/2002 | Kluth et al. |
| 6,362,300 B1 | 3/2002 | Araki et al. |
| 6,365,650 B1 | 4/2002 | Chen et al. |
| 6,387,972 B1 | 5/2002 | Ghobary et al. |
| 6,465,569 B1 | 10/2002 | Kurth |
| 6,525,107 B1 * | 2/2003 | Wendel et al. ........ 521/115 |
| 6,528,549 B2 | 3/2003 | Sieker et al. |
| 6,573,354 B1 | 6/2003 | Petrovic et al. |
| 6,605,684 B2 | 8/2003 | Primeaux, II et al. |
| 6,623,676 B1 | 9/2003 | Davis et al. |
| 6,624,244 B2 | 9/2003 | Kurth |
| 6,627,699 B2 | 9/2003 | Sawitski et al. |
| 6,632,873 B2 | 10/2003 | Chen et al. |
| 6,635,722 B2 | 10/2003 | Li et al. |
| 6,686,435 B1 | 2/2004 | Petrovic et al. |
| 6,818,675 B2 | 11/2004 | El Ghobary et al. |
| 6,864,296 B2 | 3/2005 | Kurth |
| 6,867,239 B2 | 3/2005 | Kurth |
| 7,566,406 B2 | 7/2009 | Gilder |
| 2001/0006986 A1 | 7/2001 | Sieker et al. |
| 2002/0031669 A1 | 3/2002 | Chen et al. |
| 2002/0119321 A1 | 8/2002 | Kurth et al. |
| 2002/0123598 A1 | 9/2002 | Sieker et al. |
| 2003/0138621 A1 | 7/2003 | Bollmann et al. |
| 2003/0144453 A1 | 7/2003 | Frauendorfer et al. |
| 2004/0029988 A1 | 2/2004 | Kurth |
| 2004/0034163 A1 | 2/2004 | Kurth |
| 2004/0039146 A1 | 2/2004 | Shidaker et al. |
| 2004/0102596 A1 | 5/2004 | Kurth |
| 2004/0123934 A1 | 7/2004 | Hamrick et al. |
| 2004/0151916 A1 | 8/2004 | Chen et al. |
| 2004/0175407 A1 | 9/2004 | McDaniel |
| 2004/0180806 A1 | 9/2004 | Esselbrugge et al. |
| 2004/0209971 A1 | 10/2004 | Kurth et al. |
| 2005/0004245 A1 | 1/2005 | Hamrick et al. |
| 2005/0013793 A1 | 1/2005 | Beckman et al. |
| 2005/0013987 A1 | 1/2005 | Carr et al. |
| 2005/0025930 A1 | 2/2005 | Hamrick et al. |
| 2005/0032925 A1 | 2/2005 | Kaplan |
| 2005/0080218 A1 | 4/2005 | Thiele et al. |
| 2006/0144012 A1 | 7/2006 | Manning et al. |

* cited by examiner

CURE REBOND BINDER

CROSS-REFERENCE TO RELATED APPLICATIONS

This application claims priority to U.S. Provisional Application Ser. No. 60/600,598 filed Aug. 11, 2004 and to U.S. Provisional Application Ser. No. 60/607,736 filed Sep. 7, 2004, the contents of both of which are herein incorporated by reference in their entirety.

FIELD OF THE INVENTION

The present invention relates to recycled materials. More particularly, it relates to re-utilization of particles of foamed materials that are viewed as scraps in beneficial end uses.

DESCRIPTION OF THE RELATED ART

The present invention relates to processes in which scrap urethane foam from various industries which produce urethane foams is cut or otherwise formed into a plurality of small pieces having sizes between about 1 millimeter (mm) and 75 mm, which small pieces are subsequently coated with an isocyanate prepolymer. The particles, or "crumb" as it is sometimes called, are then squeezed together to a predetermined density and injected with steam. The steam reacts with the prepolymer or binder to cause formation of a log or block. The log can then be skived to a given thickness and used for carpet underlay or other use. Rebonded foams are described in U.S. Pat. Nos. 5,817,703 and 4,385,131 the entire contents of each of which are herein incorporated by reference thereto.

In conventional practice, the log is fully saturated with steam to allow for maximum contact with the binder. The reaction proceeds slowly and the log must be allowed to dry before it can be skived or cut. Several minutes are required to saturate the log with steam, which directly effects the cycle time for the production of a log.

SUMMARY OF THE INVENTION

In one embodiment, the present invention provides a process for producing a cured polyurethane foam article that comprises particles of one or more polyurethane foams bonded together with a binder. A process according to the invention comprises: a) forming a mixture comprising: i) a plurality of particles of polyurethane foam; ii) a binder that comprises a prepolymer made from an organic isocyanate and a polyol, and optionally an extender oil; and iii) an effective catalytic amount of a tertiary amine; and b) curing the mixture by contacting it with steam. A process according to the invention may be carried out at any temperature in the range of about 0 degrees centigrade (° C.) to about 300° C., and at any pressure in the range of about 0 pounds per square inch (psi) to about 1000 psi at any degree of temperature within the aforesaid range. According to a preferred form of the invention, the tertiary amine is present in any amount in the range of about 0.01% to about 2.00% by weight based on the total weight of the finished foam article.

Thus, a process according to the invention will produce a flexible, cured polyurethane foam article that comprises particles of one or more polyurethane foams bonded together with a binder; which foam article comprises a tertiary amine in any amount in the range of about 0.01% to about 2.00% by weight based on the total weight of the foam article, because the tertiary amine, such as 2,2'-dimorpholinodiethylether, is not degraded appreciably (if at all) during production of a foam article according to the invention. The use of a tertiary amine, such as 2,2'-dimorpholinodiethylether, in a re-bonding process according to the invention drastically reduces manufacturing throughput time, by up to 50%. The present invention provides for the use of tertiary amines in any other process in which a binder comprising a polyol and an organic isocyanate is used to hold a plurality of particles together, such as bonding plywood or shoe soles.

In another embodiment, the present invention provides a flexible, cured polyurethane foam article which comprises particles of one or more polyurethane foams bonded together with a binder, which foam article comprises a tertiary amine in any amount in the range of about 0.01% to about 2.00% by weight based on the total weight of said foam article.

In yet another embodiment, the present invention provides a re-bond composition comprising an organic isocyanate, a polyol, a diluent, and a tertiary amine.

DETAILED DESCRIPTION OF THE INVENTION

In this invention, a tertiary amine, which in one embodiment may be 2,2'-dimorpholinodiethylether (JEFFCAT® DMDEE catalyst available from Huntsman, LLC of The Woodlands, Texas), is added at level of approximately one percent to the binder. The tertiary amine, such as the JEFFCAT® DMDEE catalyst, will not react with the binder as long as the binder is kept dry using a dry atmosphere. Once steam or moisture comes in contact with the binder as in the steaming operation, the speed of the reaction is increased by the tertiary amine. The tertiary amine makes the isocyanate/water reaction more efficient and reduces the amount of moisture necessary to complete the reaction. The result is a reduction in steam time and a shorter cycle time. More logs can be produced in a given time period or work shift.

In one embodiment of the present invention, the tertiary amine, such as the JEFFCAT® DMDEE catalyst, can be added to the binder in a batch process before the crumb is coated using a mix tank that is under a dry air or nitrogen blanket. In another embodiment the tertiary amine, such as the JEFFCAT® DMDEE catalyst, can also be metered in a separate stream as the crumb is being coated with the binder. Typically, no other changes in the standard process are necessary other than the amount of steam normally used can be reduced by using the tertiary amine.

The two runs described represented a 4.0 pound per cubic foot log (low density) and an 8.0 pound per cubic foot log (high density). In each case, the steam time could be reduced by one minute without affecting the quality of the log. The quality or acceptability of the log was determined by examining the log as it was removed from the mold. If there was excessive flaking or loss of crumb particles as the log was removed from the mold, the log was unacceptable. If the log had poor tensile strength as determined by pulling or prodding at the log, it was unacceptable. The logs containing JEFFCAT® DMDEE catalyst made acceptable logs using one minute less steam time than the control logs. For example, if the shortest steam time that could be used for the control binder was three minutes, then the steam time could be reduced to two minutes using JEFFCAT® DMDEE catalyst.

The first step in production of a material in accordance with this invention is to make the adhesive composition.

Preparation of Re-Bond Adhesive Composition

The method used to make a re-bond adhesive on a laboratory scale is detailed below. The adhesive sample was produced in a wide-mouth 16-ounce jar (400-grams of adhesive). The following general steps in the numerical order presented were used to produce a re-bond adhesive according to a preferred form of the invention: 1) The appropriate amount of an organic isocyanate is added to a 16-ounce jar; 2) The appropriate amount of a polyol is added to the same 16-ounce jar; 3) The appropriate amount of diluent (e.g. aliphatic or aromatic hydrocarbon, or mixture thereof) is added to the 16-ounce jar; 4) The jar is sealed and the contents shaken until homogeneous (approximately 15-seconds); 5) The jar is placed in a convection oven and maintained at approximately 50° C. to 55° C. for 24-hours; 6) The jar is removed (adhesive sample) from the oven and allowed to cool to room temperature (approximately 3-hours); 7) If a catalyst is to be used, it is added at this step, and the jar contents mixed completely; and 8) An appropriate amount of adhesive is used to yield a re-bonded underlay sample.

The following Table I contains relative amounts of materials used in preparation of re-bond adhesives according to methods of the present invention, and the prior art:

TABLE I

| Component | Isocyanate Sample ID | | | | | |
|---|---|---|---|---|---|---|
| | 1 | 2 | 3 | 4 | 5 | 6 |
| RUBINATE ® 9471 isocyanate | 33.33 | 33.33 | 33.33 | — | — | — |
| RUBINATE ® 9041 isocyanate | — | — | — | 33.33 | 33.33 | 33.33 |
| VORANOL ® 3512A | 33.33 | 33.33 | 33.33 | 33.33 | 33.33 | 33.33 |
| VIPLEX ® 222 oil | 33.33 | 33.33 | 33.33 | 33.33 | 33.33 | 33.33 |
| JEFFCAT ® DMDEE amine | — | 1.0 | 2.0 | — | 1.0 | 2.0 |

Preparation of Re-bonded Underlay Samples

The following procedure was used to produce all re-bonded underlay samples on a laboratory scale. On a commercial-scale practice level, re-bond manufacturers follow a similar procedure as the one detailed below; however, with few subtle differences. Despite the subtle differences, the procedure which now follows is reflective of the standard re-bond industry production method: To a mixing vessel is added an appropriate amount (based on target density) of ground (approximately 1 cm longest length diameter particles) foam which is to be re-bonded. The mixer (approximately 280-RPM) is energized, causing the foam crumb to begin tumbling around the inside of the mixing vessel rapidly, and an appropriate amount of adhesive is subsequently poured over the tumbling foam crumb over the course of about one minute. The adhesive and foam crumb are allowed to tumble together for one minute, after which time the mixer is turned off and the mixing vessel removed, and the adhesive-coated crumb is poured into a press and leveled using mechanical means so that an even-density pad will be produced. The press is closed, the coated crumb is compressed to an appropriate desired thickness, and the steam-valve is opened to steam treat the coated crumb for four minutes. The steam is ceased, the press is opened, and the re-bonded underlay sample is allowed to cool to room temperature. Such processing is well-known in the art.

Examples A and B in Table II below are control samples for the RUBINATE® R-9471 isocyanate. Example A has a steam exposure time of 90 seconds while B has a steam exposure time of 120 seconds. It is evident that the 120 seconds of steam yields a better product than 90 seconds of steam, all else held equal. Examples G and H have respectively one part by weight (pbw) and two pbw of JEFFCAT® DMDEE catalyst in the adhesive. The steam exposure time was 90 seconds for these examples. One pbw of JEFFCAT® DMDEE catalyst in the isocyanate gave a final re-bonded sample which was better than sample B, which was steamed for 120 seconds, which did not have any JEFFCAT® DMDEE catalyst in the isocyanate, thus evidencing the advantages of using the JEFFCAT® DMDEE catalyst. Two parts of JEFFCAT® DMDEE catalyst in the isocyanate with 90 seconds of steaming yielded an even superior product.

Examples C and D are controls for the RUBINATE® R-9041 isocyanate. Example C has a steam time of 90 sec while D has a steam time of 120 seconds. It is evident that the 120 seconds of steam yields a better product than 90 seconds of steam, all else being held equal. Examples E and F have respectively one pbw and two pbw of JEFFCAT® DMDEE catalyst in the isocyanate, and the steam time for these samples was 90 seconds. One pbw of JEFFCAT® DMDEE catalyst in the isocyanate, steamed for 90 seconds, afforded an almost as good product as sample D, which was steamed for 120 seconds and had no JEFFCAT® DMDEE catalyst in the RUBINATE® R-9041 isocyanate. Two parts of JEFFCAT® DMDEE catalyst with 90 seconds of steaming provided an even more superior product. Sample I, having one pbw of JEFFCAT® DMDEE catalyst and 120 seconds of steam, was the best of all.

TABLE II

| | Example | | | | | | | | |
|---|---|---|---|---|---|---|---|---|---|
| | A | B | G | H | D | I | C | E | F |
| Binder composition, % | | | | | | | | | |
| | 1 | 1 | 2 | 3 | 4 | 5 | 4 | 5 | 6 |
| RUBINATE ® 9471 isocyanate | 33.33 | 33.33 | 33.33 | 33.33 | | | | | |
| RUBINATE ® 9041 isocyanate | | | | | 33.33 | 33.33 | 33.33 | 33.33 | 33.33 |
| VORANOL ® 3512A | 33.33 | 33.33 | 33.33 | 33.33 | 33.33 | 33.33 | 33.33 | 33.33 | 33.33 |
| VIPLEX ® 222 oil | 33.33 | 33.33 | 33.33 | 33.33 | 33.33 | 33.33 | 33.33 | 33.33 | 33.33 |
| JEFFCAT ® DMDEE catalyst | 0 | 0 | 1.0 | 2.0 | 0 | 1.0 | 0 | 1.0 | 2.0 |
| Mold Dimensions | | | | | | | | | |
| Length (in) | 17 | 17 | 17 | 17 | 17 | 17 | 17 | 17 | 17 |
| Width (in) | 17 | 17 | 17 | 17 | 17 | 17 | 17 | 17 | 17 |
| Height (in) | 1 | 1 | 1 | 1 | 1 | 1 | 1 | 1 | 1 |

TABLE II-continued

| | Example | | | | | | | | |
|---|---|---|---|---|---|---|---|---|---|
| | A | B | G | H | D | I | C | E | F |
| | Binder composition, % | | | | | | | | |
| | 1 | 1 | 2 | 3 | 4 | 5 | 4 | 5 | 6 |
| Density of Block | | | | | | | | | |
| Target Density (pcf) | 3 | 3 | 3 | 3 | 3 | 3 | 3 | 3 | 3 |
| Volume (ft³) | 0.17 | 0.17 | 0.17 | 0.17 | 0.17 | 0.17 | 0.17 | 0.17 | 0.17 |
| Composition of Block | | | | | | | | | |
| Binder Loading, (%) | 10 | 10 | 10 | 10 | 10 | 10 | 10 | 10 | 10 |
| Prime Crumb (%) | 90 | 90 | 90 | 90 | 90 | 90 | 90 | 90 | 90 |
| Total, (%) | 100 | 100 | 100 | 100 | 100 | 100 | 100 | 100 | 100 |
| Ingredients | | | | | | | | | |
| Adhesive Mass (g) | 22.8 | 22.8 | 22.8 | 22.8 | 22.8 | 22.8 | 22.8 | 22.8 | 22.8 |
| Prime Crumb Mass (g) | 204.8 | 204.8 | 204.8 | 204.8 | 204.8 | 204.8 | 204.8 | 204.8 | 204.8 |
| Total Sample Mass (g) | 227.6 | 227.6 | 227.6 | 227.6 | 227.6 | 227.6 | 227.6 | 227.6 | 227.6 |
| Process Conditions | | | | | | | | | |
| Steam Time (sec) | 90 | 120 | 90 | 90 | 120 | 120 | 90 | 90 | 90 |
| Mix Time (sec) | 60 | 60 | 60 | 60 | 60 | 60 | 60 | 60 | 60 |
| Mixer Speed (rpm) | 282 | 282 | 282 | 282 | 282 | 282 | 282 | 282 | 282 |
| Adhesive Temperature (° F.) | RT | RT | RT | RT | RT | RT | RT | RT | RT |
| Pre-compression Steam Time (sec.) | 0 | 0 | 0 | 0 | 0 | 0 | 0 | 0 | 0 |
| Rating | 2+ | 3− | 3+ | 4 | 3+ | 4 | 2− | 3 | 4 |

The rating system used in the last row of Table II is as follows: 1=no cure, block falls apart; 2=less than 50% cured, more than half the block falls apart; 3=more than 50% cured, less than half of the block falls apart; 4=fully cured, block held together, with no degradation, crumbling, or falling apart. Plus and minus signs listed after the rating number denote whether the sample had a low (−), average (no sign), or high (+) performance within that particular rating number.

In one embodiment of the present invention, the tertiary amine may be 2,2'-dimorpholinodiethylether (JEFFCAT® DMDEE catalyst). In another embodiment of the present invention, the tertiary amine may be a morpholine based amine. Such morpholine based amines may include, but are not limited to: N-ethylmorpholine; N-t-butylmorpholine; N-methylmorpholine; N-butylmorpholine; Huntsman JEFF-CAT® PM catalyst; Huntsman JEFFCAT® M-70 catalyst; hydroxyethylmorpholine; 4-(2-methoxyethyl-)morpholine; and combinations thereof. In yet another embodiment of the present invention, the tertiary amine may be a non-morpholine based amine. The non-morpholine based amines may include, but are not limited to: Bis-(2-dimethylaminoethyl) ether; triethylenediamine; N-(3-dimethylaminopropyl)-N,N-diisopropanolamine; N,N-bis(3-dimethylaminopropyl-N-isopropanolamine; 2-((2-(2-(dimethylamino)ethoxy)ethyl) methylamino)ethanol; 2,11-dimethyl-2,11-diaza-5,8-dioxa-dodecan; benzyldimethylamine (JEFFCAT® BDMA catalyst), dimethylpiperzine; pentamethyldiethylenetriamine (JEFFCAT® PMDETA catalyst); pentamethyldipropylen-etriamine (JEFFCAT® ZR-40 catalyst); N,N,N',-trimethyl-N'-hydroxyethylethanediamine-1,2 (JEFFCAT® Z-110 catalyst); 1,3,5-tris-(3-dimethylaminopropyl-)hexahydro-s-triazine (JEFFCAT® TR-90 catalyst); dimethylethanolamine (JEFFCAT® DMEA catalyst); tetramethyldipropylenetri-amine (JEFFCAT® Z-130 catalyst); N,N-dimethyl-2(2-aminoethoxy)ethanol (DMDGA™ catalyst or JEFFCAT® ZR-70 catalyst); and combinations thereof. In further embodiments of the present invention, the tertiary amine may include, but not be limited to: 2,2'-dimorpholinodiethylether, at least one morpholine based amine, at least one non-morpholine based amines, and combinations thereof. One skilled in the art, with the benefit of this disclosure, will recognize appropriate tertiary amines for use in this invention.

As used in the present specification and the appended claims, the term "organic isocyanate" includes a wide variety of materials recognized by those skilled in the art as being useful in preparing polyurea and polyurethane polymer materials. Included within this definition are both aliphatic and aromatic isocyanates, as well as one or more prepolymers or quasi-prepolymers prepared using such isocyanates as a starting material, as is generally well known in the art. Preferred examples of aliphatic isocyanates are of the type described in U.S. Pat. No. 4,748,192, as well as aliphatic di-isocyanates and, more particularly, the trimerized or the biuretic form of an aliphatic di-isocyanate, such as hexamethylene di-isocyanate ("HDI"), and the bi-functional monomer of the tetraalkyl xylene di-isocyanate, such as the tetramethyl xylene di-isocyanate. Cyclohexane di-isocyanate is also to be considered a useful aliphatic isocyanate. Other useful aliphatic polyisocyanates are described in U.S. Pat. No. 4,705,814. They include aliphatic di-isocyanates, for example, alkylene di-isocyanates with 4 to 12 carbon atoms in the alkylene radical, such as 1,12-dodecane di-isocyanate and 1,4-tetramethylene di-isocyanate. Also useful are cycloaliphatic di-isocyanates, such as 1,3 and 1,4-cyclohexane di-isocyanate as well as any mixture of these isomers, 1-isocyanato-3,3,5-trimethyl-5-isocyanatomethylcyclohexane (isophorone di-isocyanate); 4,4'-,2,2'- and 2,4'-dicyclohexylmethane di-isocyanate as well as the corresponding isomer mixtures, and the like.

A wide variety of aromatic polyisocyanates may also be used to form a polymer according to the present invention, and typical aromatic polyisocyanates include p-phenylene di-isocyanate, polymethylene polyphenylisocyanate, 2,6-toluene di-isocyanate, dianisidine di-isocyanate, bitolylene di-isocyanate, naphthalene-1,4-di-isocyanate, bis(4-isocyanatophenyl) methane, bis(3-methyl-3-iso-cyanatophenyl) methane, bis(3-methyl-4-isocyanatophenyl)methane, and 4,4'-diphenylpropane di-isocyanate, as well as MDI-based quasi-prepolymers such as those available commercially as RUBINATE® 9480, RUBINATE® 9484, RUBINATE® 9471, RUBINATE® 9041, and RUBINATE® 9495 from Huntsman International, LLC of the Woodlands, TX. Other aromatic polyisocyanates used in the practice of the invention are methylene-bridged polyphenyl polyisocyanate mixtures that have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979. Usually methylene-bridged polyphenyl polyisocyanate mixtures contain about 20 to about 100 weight percent methylene di-phenyl-di-isocyanate isomers, with the remainder being polymethylene polyphenyl di-isocyanates having higher functionalities and higher molecular weights. Typical of these are polyphenyl polyisocyanate mixtures containing about 20 to about 100 weight percent di-phenyl-di-isocyanate isomers, of which about 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979. The present invention includes the use of mixtures of isomers of isocyanates that are produced simultaneously in a phosgenation reaction, or any blend of two or more isocyanates (including two or more mixtures of isocyanates, or a single isocyanate with a mixture of isocyanates) that are produced using two or more separate phosgenations. One preferred aromatic polyisocyanate is methylene bis(4-phenylisocyanate) or "MDI". Pure MDI, quasi-prepolymers of MDI, modified pure MDI, etc. are useful to prepare materials according to the invention. Since pure MDI is a solid and, thus, often inconvenient to use, liquid products based on MDI or methylene bis(4-phenylisocyanate) are also useful herein. U.S. Pat. No. 3,394,164 describes a liquid MDI product. More generally, uretonimine modified pure MDI is included also. This product is made by heating pure distilled MDI in the presence of a catalyst. The liquid product is a mixture of pure MDI and modified MDI. The term organic isocyanate also includes quasi-prepolymers of isocyanates or polyisocyanates with active hydrogen containing materials. Other possible isocyanates included toluene diisocyanate (TDI) and modified TDIs. Isocyanates may also include blends using TDIs, modified TDIs, MDIs, modified MDIs, prepolymers and combinations thereof. Any of the isocyanates mentioned above may be used as the organic isocyanate component in the present invention, either alone or in combination with other aforementioned isocyanates.

Additionally, a wide variety of polyols may be used in forming a polyurethane adhesive suitable for re-bonding foam crumbs in a process according to the present invention, including: polyester polyols, polyether polyols, mannich polyols, and sucrose polyols. In addition, various materials known to those in the polyurethane arts such as, surfactants, either organic or silicon based, extender oils, carbonate esters (cyclic or linear), solvents, esters, fillers, other amine catalysts, blowing agents such as hydrocarbon, carbon dioxide, FREON® 141B, HFC-245FA.

This specification and the appended claims make reference to "particles" of foam, and other materials such as wood. As used herein the word particles shall not be construed to be limited in any way by their geometric shape, as the shape of particles of foam to be rebonded and wood particles are well known in the art to comprise irregular and random shapes. Particles include bits, chunks, pieces, segments, spheroids, ovals, clumps, etc. According to one preferred form of the invention, the longest length dimension of the particles employed in the process is about 15 centimeters (cm). According to another form of the invention, the longest length dimension of the particles employed in the process is about 6 cm. According to another form of the invention, the longest length dimension of the particles employed in the process is about 4 cm. According to another form of the invention, the longest length dimension of the particles employed in the process is about 1 cm. According to another form of the invention, the longest length dimension of the particles employed in the process is about 0.05 mm. Particles of any size in the range of between about 0.05 cm and less to 15 cm and greater may be bonded in a process according to the invention.

In an alternate form of the invention, an acid-blocked catalyst is included, as a catalyst, in the formulation. Acid-blocked catalysts are well-known in the art to be salts or adducts formed from the combination of: 1) amines (and polyamines), whether primary, secondary, or tertiary, and including those which contain one or more of primary, secondary, or tertiary nitrogen atoms in the same molecule; with 2) one or more carboxylic acids, whether mono-, di-, tri- or higher functional with regard to the number of carboxylate functions present. Typical carboxylic acids from which acid-blocked catalysts are made include mono-, di-, and tri-hydroxy benzoic acids and their esters, dimer acids, acetic acid, aliphatic mono, di-, and tri-carboxylic acids including without limitation, succinic acid, propionic acid, tartaric acid, citric acid, formic acid, acetic acid, lactic acid, salicylic acid, 2-ethylhexanoic acid, octadecanoic acid, octadecenoic acid, capric acid, caprylic acid, caproic acid, oleic acid, erucic acid, linoleic acid, and linolenic acid, as well as those acids and salts/adducts specified in U.S. Pat. Nos. 6,387,972 and 5,489,618, the entire contents of which are herein incorporated by reference. Basically, any amine (primary, secondary, tertiary, monamine, di-amine, tri-amine or higher polyamine) salt of a carboxylic acid is suitable as a blocked catalyst according to the invention, and the presence thereof may in one embodiment be effected by addition of a suitable amount of an organic acid to an already-existing amine catalyst, so that part of the amine of the catalyst reacts with the organic acid to form the blocked catalyst, while leaving some free amine behind in the catalyst. The present invention also contemplates the situation in which an excess of organic acid is present as well. Especially preferred are salts/adducts made by combining the tertiary amine, such as 2,2'-dimorpholino-diethylether, with one or more organic acids as aforesaid. Salts/adducts between an organic acid and an amine are herein collectively referred to as "acid-blocked catalysts".

In view of the teachings herein, it may occur to some readers that the present invention is also useful in a so-called continuous re-bond operation, wherein the urethane crumb is coated with binder on a continuous basis. In such scenario, the tertiary amine, JEFFCAT® DMDEE catalyst or JEFFCAT®

DMDEE catalyst blend is injected into the binder using a metering system. The coated crumb is then dropped onto a moving conveyor belt at specific rate. The crumb is steamed on the conveyor and then transferred to onto a bottom film which is then covered with a top film. The top and bottom film become the slip film for the finished pad. The re-bond sandwich will move through a series of nip rolls until it reaches a predetermined height of approximately one inch (twice the thickness of the final pad). A saw cuts the pad horizontally and the top and bottom half is rolled up to form two separate rolls of carpet pad. The pad must be sufficiently cured at this time not to take a set when compressed in a roll. The use of a tertiary amine reduces the amount of steam used in the process and improves the cure.

A composition used in a process according to the present invention also may include one or more surfactants known in the art to be useful in subcombinations and combinations from which polyurethanes may be prepared. A few non-limiting examples include those sold under the trade name "TEGOSTAB®" by Goldschmidt Chemical Company, such as TEGOSTAB® B-8407 surfactant; TEGOSTAB® B-8474 surfactant; TEGOSTAB® B-2219 surfactant; TEGOSTAB® B-8870 surfactant; TEGOSTAB® B-8433 surfactant; TEGOSTAB® B-8404 surfactant; TEGOSTAB® B-8462 surfactant; TEGOSTAB® B-8467 surfactant; TEGOSTAB® B-8465 surfactant; and TEGOSTAB® B-8470 surfactant. Another example of a suitable surfactant is SURFONIC® N-120 surfactant which is commercially available from Huntsman Petrochemical Corporation of The Woodlands, TX. Surfactants may also include silicone surfactants and combinations of surfactants. One skilled in the art, with the benefit of this disclosure, would recognize other suitable surfactants for use in this invention.

Processes and compositions disclosed herein may also include additional additives. Additives may include, but not be limited to: extender oils, carbonate esters, solvents, esters, fillers, other amine catalysts, blowing agents, or combinations thereof. One skilled in the art, with the benefit of this disclosure, will recognize suitable additives to use in the present invention.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. The present disclosure includes the subject matter defined by any combination of any one of the various claims appended hereto with any one or more of the remaining claims, including the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claim so modified. This also includes combination of the features and/or limitations of one or more of the independent claims with the features and/or limitations of another independent claim to arrive at a modified independent claim, with the remaining dependent claims in their original text being read and applied to any independent claim so modified. Accordingly, the presently disclosed invention is intended to cover all such modifications and alterations, and is limited only by the scope of the claims which follow, in view of the foregoing and other contents of this specification.

What is claimed is:

1. A process for producing a cured polyurethane foam article that comprises particles of one or more polyurethane foams bonded together with a binder, which process consisting of: a) forming a mixture consisting of: i) a plurality of particles of polyurethane foam; ii) a prepolymer made from an organic isocyanate and a polyol; iii) a catalyst of 2,2'-dimorpholinodiethylether; and iv) optionally a surfactant, an organic or silicon based extender oil, an ester, a solvent or a blowing agent; and b) curing said mixture by contacting it with steam.

2. The process according to claim 1 which is carried out at any temperature in the range of about 0° C. to about 400° C.

3. The process according to claim 1 which is carried out at any pressure in the range of about 0 psi to about 1000 psi.

4. The process according to claim 1 wherein the catalyst is present in an amount in the range of about 0.01% to about 2.00% by weight based on the total weight of the finished foam article.

5. The process according to claim 1 wherein the average size of said particles is such that their average longest length diameter is any value in the range of about 0.5 cm to about 15 cm.

6. The process according to claim 1 wherein said mixture contains at least one surfactant.

7. The process according to claim 1 wherein said mixture contains at least one silicone surfactant.

8. A method consisting of:
coating a plurality of polyurethane foam particles with a binder system, said binder system consisting of an organic isocyanate, a polyol, a catalyst of 2,2'-dimorpholinodiethylether and optionally a surfactant, an organic or silicon based extender oil, an ester, a solvent or a blowing agent;
compressing the coated polyurethane particles; and
curing the coated polyurethane particles with steam.

9. The method of claim 8 wherein the coating includes coating the plurality of polyurethane foam particles with the binder in a mixing apparatus.

10. The method of claim 8 wherein said coating includes adding said binder system to said polyurethane foam particles as a single mixture of binder components.

11. The method of claim 8 wherein coating includes forming a prepolymer with the organic isocyanate and the polyol and adding the resultant prepolymer to the polyurethane foam particles in one stream, and adding the catalyst to the polyurethane foam particles in another, different stream, both streams added to a same mixing apparatus.

12. The method of claim 8 wherein compressing includes transferring the coated polyurethane foam particles to a pressing apparatus and applying a force to compress the coated polyurethane foam particles.

13. The method of claim 12 wherein curing includes, during compression, allowing the steam to treat the coated polyurethane foam particles.

14. A process for producing a cured polyurethane foam article comprising: a) forming a mixture consisting of: i) a plurality of particles of polyurethane foam; ii) a prepolymer made from an organic isocyanate and a polyol; iii) a catalyst of 2,2'- dimorpholinodiethylether; and iv) optionally a surfactant, an organic or silicon based extender oil, an ester, a solvent or a blowing agent; and b) curing said mixture by contacting it with steam; and wherein the cured polyurethane foam article consists of the cured mixture.

15. The process according to claim 14 which is carried out at any temperature in the range of about 0° C. to about 400° C.

16. The process according to claim 14 which is carried out at any pressure in the range of about 0 psi to about 1000 psi.

17. The process according to claim 14 wherein the catalyst is present in an amount in the range of about 0.01% to about 2.00% by weight based on the total weight of the finished foam article.

* * * * *